(12) United States Patent
Haas et al.

(10) Patent No.: US 9,175,730 B2
(45) Date of Patent: Nov. 3, 2015

(54) MOUNTING ASSEMBLY

(71) Applicant: Amtek Tekfor Holding GmbH, Hausach (DE)

(72) Inventors: Roman Haas, Hausach (DE); Martin Lehmann, Hornberg (DE); Christoph Karl, Offenburg (DE)

(73) Assignee: Amtek Tekfor Holding GmbH, Hausach (DE)

( * ) Notice: Subject to any disclaimer, the term of this patent is extended or adjusted under 35 U.S.C. 154(b) by 0 days.

(21) Appl. No.: 14/354,370

(22) PCT Filed: Oct. 23, 2012

(86) PCT No.: PCT/DE2012/001022
§ 371 (c)(1),
(2) Date: Apr. 25, 2014

(87) PCT Pub. No.: WO2013/060319
PCT Pub. Date: May 2, 2013

(65) Prior Publication Data
US 2014/0301803 A1    Oct. 9, 2014

(30) Foreign Application Priority Data
Oct. 27, 2011  (DE) .......................... 10 2011 117 107

(51) Int. Cl.
*F16B 39/12* (2006.01)
*F16D 1/033* (2006.01)
(Continued)

(52) U.S. Cl.
CPC *F16D 1/033* (2013.01); *F16D 1/02* (2013.01); *F16D 2003/22323* (2013.01)

(58) Field of Classification Search
CPC .. F16D 1/033; F16D 1/02; F16D 2003/22323
USPC .................................................. 411/222, 432
See application file for complete search history.

(56) References Cited

U.S. PATENT DOCUMENTS

| 916,298 A | * | 3/1909 | Gifford | .......................... 411/223 |
| 4,743,138 A | | 5/1988 | Goy | |

(Continued)

FOREIGN PATENT DOCUMENTS

| DE | 103 48 320 A1 | 5/2005 |
| DE | 10 2004 048 079 A1 | 4/2006 |

(Continued)

OTHER PUBLICATIONS

International Search Report dated Mar. 12, 2013 with English translation (eight (8) pages).

*Primary Examiner* — Gary Estremsky
(74) *Attorney, Agent, or Firm* — Crowell & Moring LLP

(57) ABSTRACT

A mounting assembly is provided for, for example, joining a cardan shaft to an axle drive of a vehicle. The mounting assembly includes a nut housing having a continuous opening arranged to receive an insert nut having a continuous internal thread, a nut having a continuous internal thread, and at least one securing element which interacts with the nut housing and the nut to constrain relative axial movement between the nut housing and the nut. The insert nut and the nut housing may be rotationally fixed relative to one another, for example using complementary polygonal outer and inner surfaces, respectively. A retainer may be provided in the interior space of the nut housing to constrain axial movement of the insert nut within the nut housing.

6 Claims, 3 Drawing Sheets

(51) Int. Cl.
  *F16D 1/02*   (2006.01)
  *F16D 3/223*   (2011.01)

(56) References Cited

U.S. PATENT DOCUMENTS

| | | | | |
|---|---|---|---|---|
| 4,781,507 | A | * | 11/1988 | Duenas .................. 411/433 |
| 5,538,379 | A | * | 7/1996 | Junkers .................. 411/432 |
| 5,577,872 | A | * | 11/1996 | Nakamura ................ 411/432 |
| 7,172,380 | B2 | * | 2/2007 | Lees et al. ............... 411/372.5 |
| 7,789,608 | B2 | * | 9/2010 | Hill et al. ................ 411/432 |
| 8,012,030 | B2 | | 9/2011 | Cermak et al. |
| 8,083,430 | B2 | | 12/2011 | Cermak |
| 2004/0265090 | A1 | | 12/2004 | Stone |
| 2005/0132831 | A1 | | 6/2005 | Scholz |
| 2010/0119301 | A1 | | 5/2010 | Langer et al. |

FOREIGN PATENT DOCUMENTS

| | | |
|---|---|---|
| DE | 10 2007 038 878 A1 | 2/2008 |
| DE | 10 2008 009 363 B4 | 12/2009 |
| DE | 10 2007 026 040 B4 | 6/2011 |
| FR | 2 884 289 A1 | 10/2006 |
| JP | 2003-56538 A | 2/2003 |
| WO | WO 2007/044003 A1 | 4/2007 |

* cited by examiner

MOUNTING ASSEMBLY

This application is a National Phase of PCT International Application No. PCT/DE2012/001022, filed Oct. 23, 2012, which claims priority under 35 U.S.C. §119 from German Patent Application No. 10 2011 117 107.3, filed Oct. 27, 2011, the entire disclosures of which are herein expressly incorporated by reference.

The invention relates to a mounting assembly, in particular a mounting assembly for a motor vehicle and, in particular, in a drive train of a vehicle.

In the prior art it is customary in motor vehicles to connect the cardan shaft to the rear axle drive by means of flanged couplings. To some extent flange nuts are also used; and these flange nuts have the task of sealing the rear axle drive and preloading the bearing. Some embodiments may be found, for example, in the German patent documents DE 10 2004 048 079 A1, DE 10 2007 026 040 B4, DE 10 2007 038 878 A1 or DE 10 2008 009 363 B4.

The disadvantages of such connections of the prior art may consist of a high weight, large space requirement, and a costly and complicated assembly.

The object of the present invention is to provide a mounting assembly, in particular, for components of a motor vehicle in such a way that the disadvantages of the prior art are overcome.

The invention achieves this engineering object by means of a mounting assembly comprising a nut housing, which has a continuous opening, in the interior of which there is an internal space; an insert nut, which has a continuous internal thread and which is arranged in the internal space of the nut housing; a nut, which has a continuous internal thread; and at least one securing element, which interacts with the nut housing and the nut, and which defines a relative axial movement between the nut housing and the nut. Working on this basis, the mounting assembly according to the invention consists of at least two nuts, which are connected to each other in the axial direction. In this case at least one nut is formed by a nut housing, in which an insert nut with an internal thread is inserted. In one embodiment both nuts are constructed in this way.

One embodiment provides that the nut has a recess; that the nut housing is partially arranged in the recess; and that the securing element is arranged on the outer face of the recess and on the outer face of the nut housing. As a result, the axial fixing produces a securing element that is located outside the nut and the nut housing.

One embodiment of the invention consists of the fact that the securing element is a sheet metal ring, which is provided with a flange around at least one peripheral projection, which is formed on the outer face of the nut.

One embodiment provides that the nut housing and the nut can be rotated in opposite directions. The nut housing is connected to the insert nut in such a way that said nut housing is, in particular, torsionally rigid, so that in this embodiment the nut and the combination of nut housing and insert nut can be rotated in each instance individually and, as a result, can be connected to the respective components of the vehicle.

One embodiment of the invention includes that at least one retaining ring is provided and that this retaining ring secures the insert nut in the internal space of the nut housing in the axial direction.

One embodiment provides that the insert nut and the nut housing are designed and adapted to each other in such a way that the insert nut is arranged in the nut housing in such a way that said insert nut is torsionally rigid.

One embodiment of the invention comprises that the insert nut has a polygonal portion on its outer face and that the nut housing has a corresponding polygonal portion in its internal space. The polygonal portion is, for example, a hexagon.

One embodiment provides that the insert nut and the nut have different inside diameters.

One embodiment of the invention comprises that the nut has a flange portion.

One embodiment provides that at least one dust cover plate is arranged on the side of the flange portion of the nut that faces away from the nut housing.

Other objects, advantages and novel features of the present invention will become apparent from the following detailed description of one or more preferred embodiments when considered in conjunction with the accompanying drawings.

DETAILED DESCRIPTION

Figure 1:
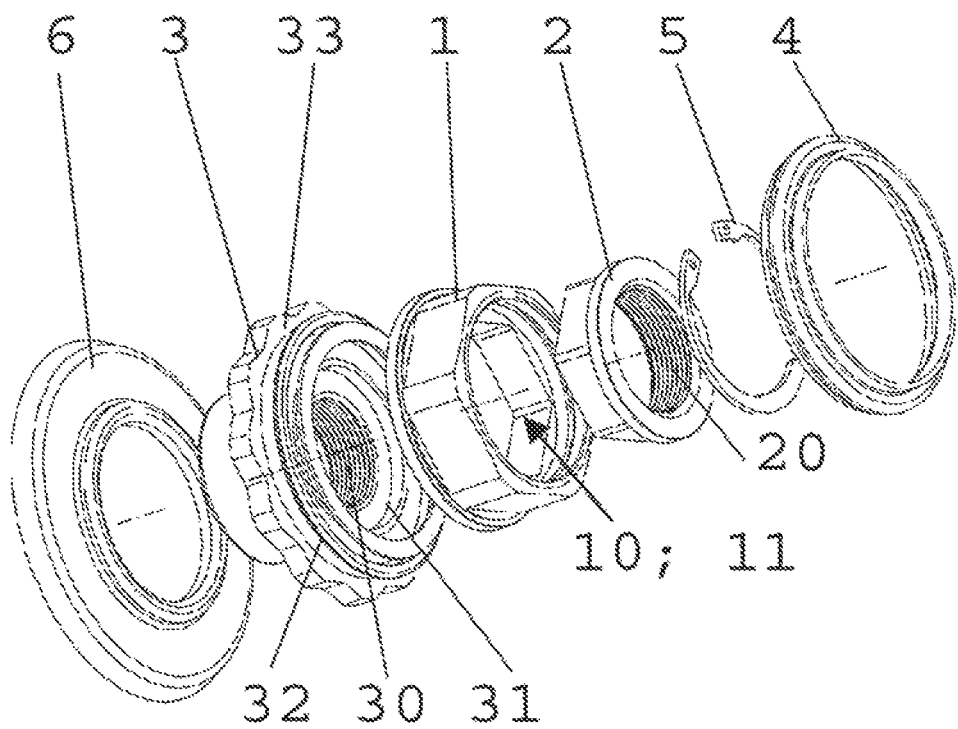
FIG. 1 is an exploded view of a mounting assembly according to an embodiment of the invention.

FIG. 1 shows the individual components of the mounting assembly according to an embodiment of the invention. The nut 3 has a continuous internal thread 30. A recess 31 is connected to one end of said internal thread; and a flange portion 33 is connected externally to one end of said internal thread.

Furthermore, the outer face of the recess 31 has a projection 32 that projects outwardly. In this case the recess 31 is designed in such a way that it can accommodate a part of the nut housing 1. The nut housing 1 and the nut 3 can be secured in the axial direction by means of the securing element 4. In so doing, the securing element 4 is mounted outside the nut housing 1 and the nut 3, where a flange is formed with one end around the projection 32 of the nut 3. The nut housing 1 has a continuous opening 10, which in turn produces an internal space 11. In this embodiment the internal space 11 does not have a thread and is designed, in particular, in the form of a polygon (in this case, in particular, as a hexagon). Inserted into the internal space 11 is the insert nut 2, which has an internal thread 20. The insert nut 2 is held in the nut housing 1 by means of the retaining ring 5. For this purpose, the retaining ring 5 snaps, for example, to some extent into a groove on the inner face of the nut housing 1. The outer face of the insert nut 2 is designed with a polygonal portion, in this case a hexagonal portion, in such a way that said outer face of the insert nut matches the internal space 11 of the nut housing 1, so that the insert nut 2 is arranged in the nut housing 1 in such a way that said insert nut is torsionally rigid. A dust cover plate 6 is provided on the side of the nut 3 that faces away from the nut housing 1 and, as a result, is located below the flange portion 33 of said distal side of the nut.

Figure 2:
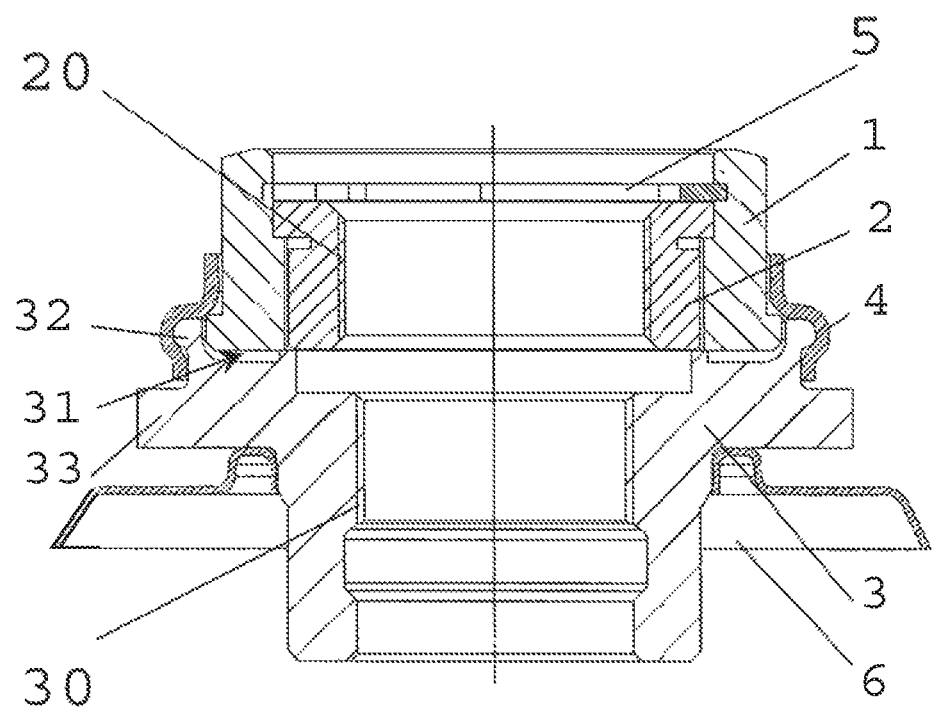
FIG. 2 is a sectional view of the mounting assembly of FIG. 1.

FIG. 2 is a sectional view of the composite mounting assembly from FIG. 1. The insert nut 2 may be found in the nut housing 1, where it is held by means of the retaining ring 5. The nut housing 1 lies with one end on the recess 31 of the nut 3 and is, thus, also partially situated in the nut 3. At the same time the nut 3 and the nut housing 1 can be rotated in opposite directions. The nut 3 and the nut housing 1 are secured in the axial direction by means of the securing element 4, which is located outside the nut 3 and the nut housing 1 and which is provided with a flange about the projection 32 of the nut 3. The dust cover plate 6 is located beneath the flange portion 33 of the nut 3. It can be seen in the embodiment depicted that the inside diameter 20 of the insert nut 2 is larger than the inside diameter 30 of the nut 3. In this respect the interchangeability of the insert nut 2 allows any choice of the type of internal thread 20. As a result, the combination of nut housing 1 and insert nut 2 makes it easy to adapt to the different threads of the components, which are to be connected with the mounting assembly. In an alternative embodiment the nut 3 is also designed as a combination of a housing and an insert nut.

Figure 3:
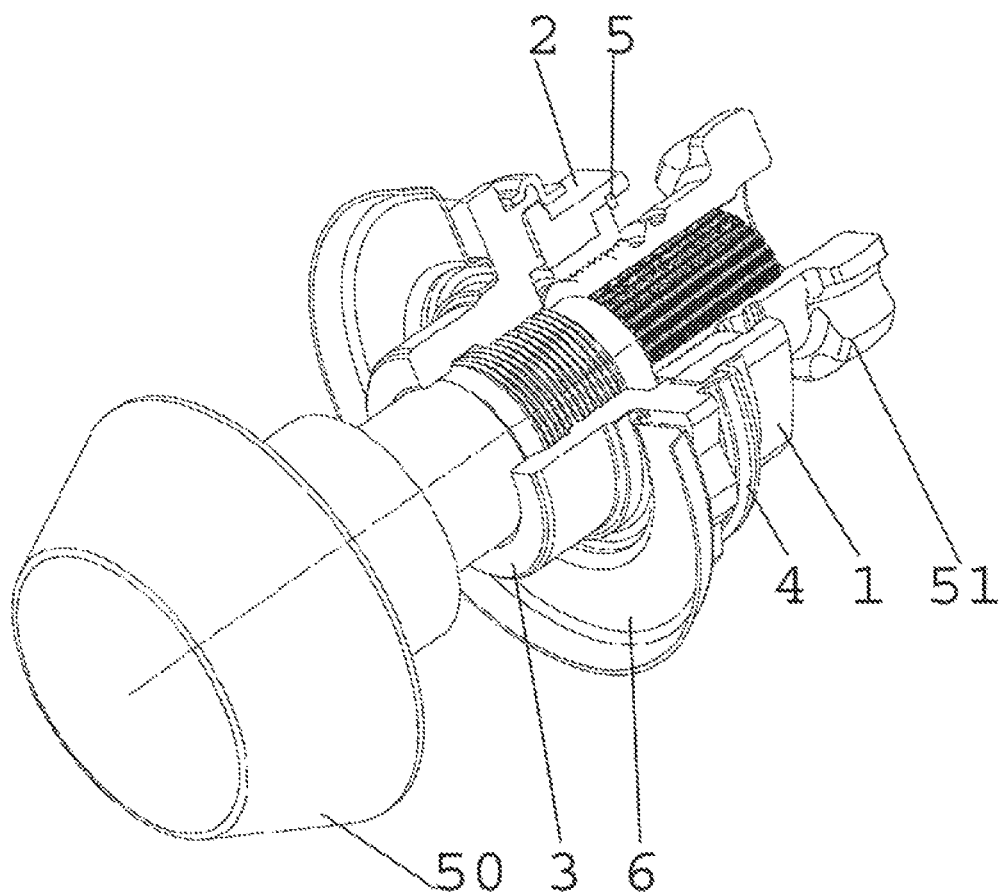
FIG. 3 is a three dimensional cutaway view of the mounting assembly of FIG. 1 with a pinion shaft and a portion of a ball joint.

In FIG. 3 a pinion shaft 50 and the inner hub of a ball joint 51 of a motor vehicle are connected to each other by way of the mounting assembly according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A mounting assembly, comprising:
a nut housing having has a continuous opening and an internal space;
an insert nut having a continuous internal thread, the insert nut being configured to be arranged in the internal space of the nut housing;
a nut having a continuous internal thread; and
at least one securing element configured to interact with the nut housing and the nut to constrain relative axial movement between the nut housing and the nut,
wherein
the nut has a recess,
the nut housing is partially arranged in the recess, and
the securing element is arranged on an outer surface of the recess and on an outer surface of the nut housing.

2. A mounting assembly, comprising:
a nut housing having has a continuous opening and an internal space;
an insert nut having a continuous internal thread, the insert nut being configured to be arranged in the internal space of the nut housing;
a nut having a continuous internal thread; and
at least one securing element configured to interact with the nut housing and the nut to constrain relative axial movement between the nut housing and the nut,
wherein the securing element is a sheet metal ring having a flange around at least one peripheral projection on the outer surface of the nut.

3. The mounting assembly as claimed in claim 2, wherein the nut has a recess,
the nut housing is partially arranged in the recess, and
the securing element is arranged on an outer surface of the recess and on an outer surface of the nut housing.

4. A mounting assembly, comprising:
a nut housing having has a continuous opening and an internal space;
an insert nut having a continuous internal thread, the insert nut being configured to be arranged in the internal space of the nut housing;
a nut having a continuous internal thread; and
at least one securing element configured to interact with the nut housing and the nut to constrain relative axial movement between the nut housing and the nut,
wherein
the insert nut and the nut housing are configured such that the insert nut is rotationally fixed relative to the nut housing, and
the insert nut has a polygonal portion on its outer face and the nut housing has a corresponding polygonal portion in its internal space.

5. The mounting assembly as claimed in claim 4, wherein at least one retaining ring is arranged in the internal space of the nut housing at a location that constrains axial movement of the insert nut in the nut housing.

6. A mounting assembly, comprising:
a nut housing having a continuous opening, an internal space and a flange portion;
an insert nut having a continuous internal thread, the insert nut being configured to be arranged in the internal space of the nut housing;
a nut having a continuous internal thread;
at least one securing element configured to interact with the nut housing and the nut to constrain relative axial movement between the nut housing and the nut, and
at least one dust cover plate arranged on a side of the flange portion of the nut facing away from the nut housing.

* * * * *